(12) United States Patent
Turnbull et al.

(10) Patent No.: US 12,113,842 B2
(45) Date of Patent: Oct. 8, 2024

(54) CONTENT DELIVERY

(71) Applicant: BRITISH TELECOMMUNICATIONS PUBLIC LIMITED COMPANY, London (GB)

(72) Inventors: Rory Turnbull, London (GB); Timothy Stevens, London (GB); Stephen Appleby, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 18/257,558

(22) PCT Filed: Dec. 3, 2021

(86) PCT No.: PCT/EP2021/084263
§ 371 (c)(1),
(2) Date: Jun. 14, 2023

(87) PCT Pub. No.: WO2022/128548
PCT Pub. Date: Jun. 23, 2022

(65) Prior Publication Data
US 2024/0114065 A1    Apr. 4, 2024

(30) Foreign Application Priority Data
Dec. 18, 2020   (GB) ..................................... 2020129

(51) Int. Cl.
*H04L 65/611* (2022.01)
*H04L 43/0888* (2022.01)
(Continued)

(52) U.S. Cl.
CPC ........ *H04L 65/611* (2022.05); *H04L 43/0888* (2013.01); *H04L 65/1069* (2013.01); *H04L 65/612* (2022.05)

(58) Field of Classification Search
CPC . H04L 65/1069; H04L 65/611; H04L 65/612; H04L 43/0888
(Continued)

(56) References Cited

U.S. PATENT DOCUMENTS

2007/0274339 A1* 11/2007 Kim .................... H04L 12/1877
                                                        370/468
2016/0150255 A1*  5/2016 Grinshpun ............. H04L 65/80
                                                        725/62
(Continued)

FOREIGN PATENT DOCUMENTS

EP          2785006 A1    10/2014
GB          2583020 A     10/2020
(Continued)

OTHER PUBLICATIONS

"IP Multicast Adaptive Bit Rate Architecture Technical Report", V01, Document Control No. OC-TR-IP-MULTI-ARCH-C01-161026, Oct. 26, 2016, 69 pages.
(Continued)

*Primary Examiner* — Glenford J Madamba
(74) *Attorney, Agent, or Firm* — Nixon & Vanderhye P.C.

(57) ABSTRACT

A method of managing a network for delivering content to a client device, where content segments are delivered over multicast to a proxy. The received segments are stored at the proxy, before delivery of those segments is made from the proxy to the client device over unicast. Whilst the proxy receives further segments over multicast, it probes the network by making unicast requests for data (dummy data or additional content segments), and receiving those segments over unicast from the content server. The multicast rate reception rate and the unicast (probe) rate are measured and a maximum network throughput is calculated as the sum of these two rates. Subsequent segments are then delivered from the proxy to the client device at the calculated maxi-
(Continued)

mum network throughput rate, or at some rate dependent thereon. Thus, the client device will receive segments at a rate that is more indicative of the actual maximum network throughput, so can better use its adaptive bit rate algorithms to determine whether a switch to higher bit rate segments is appropriate.

18 Claims, 6 Drawing Sheets

(51) Int. Cl.
    *H04L 65/1069* (2022.01)
    *H04L 65/612* (2022.01)
(58) Field of Classification Search
    USPC .......................................................... 709/231
    See application file for complete search history.

(56) References Cited

U.S. PATENT DOCUMENTS

| | | | |
|---|---|---|---|
| 2018/0205802 A1 | 7/2018 | Bowen | |
| 2018/0343291 A1 | 11/2018 | Lohmar et al. | |
| 2022/0182732 A1* | 6/2022 | Brockmann | H04N 21/23106 |

FOREIGN PATENT DOCUMENTS

| | | | | |
|---|---|---|---|---|
| WO | 2016/209266 | | 12/2016 | |
| WO | 2016209266 A1 | | 12/2016 | |
| WO | WO-2021037500 A1 * | 3/2021 | ......... | H04L 65/4076 |
| WO | WO-2021063594 A1 * | 4/2021 | ........... | H04L 1/0002 |

OTHER PUBLICATIONS

Combined Search and Examination Report for GB Application No. 2008945.4 dated Nov. 26, 2020, 6 pages.
International Search Report and Written Opinion of the ISA for PCT/EP2021/065488 dated Sep. 23, 2021, 11 pages.
International Preliminary Report on Patentability dated Dec. 22, 2022 issued for International Application No. PCT/EP2021/065488 (8 pages).
International Search Report and Written Opinion of the International Searching Authority dated Sep. 23, 2021, issued for International Application No. PCT/EP2021/065488 (11 pages).
Combined Search and Examination Report under Sections 17 and 18(3) dated Nov. 26, 2020, issued for GB Application No. GB2008945.4 (6 pages).
International Preliminary Report on Patentability dated Jun. 29, 2023, issued for International Application No. PCT/EP2021/084263 (9 pages).
Cablelabs, "IP Multicast Adaptive Bit Rate Architecture Technical Report", V01 Oct. 26, 2016, Document Control No. OC-TR-IP-MULTI-ARCH-C01-161026 (69 pages).
International Preliminary Report on Patentability dated Dec. 22, 2022, issued for International Application No. PCT/EP2021/065488 (7 pages).
International Preliminary Report on Patentability dated Jun. 13, 2023 issued for International Application No. PCT/2021/084263 (9 pages).
3GPP TS 23.246 V16.1.0, 3rd Generation Partnership Project; Technical Specification Group Services and System Aspects; Multimedia Broadcast/Multicast Service (MBMS); Architecture and functional description (Release 16), Sep. 2019, 77 pages.
Digital Video Broadcasting (DVB); Adaptive media streaming over IP multicast, DVB Document A176, Mar. 2018, 19 pages.
International Search Report and Written Opinion of the ISA for PCT/EP2021/084263 mailed Mar. 17, 2022, 7 pages.
Combined Search and Examination Report for GB2020129.9 dated Apr. 30, 2021, 5 pages.

* cited by examiner

CONTENT DELIVERY

CROSS-REFERENCE TO RELATED APPLICATIONS

This application is the U.S. national phase of International Application No. PCT/EP2021/084263 filed Dec. 3, 2021, which designated the U.S. and claims priority to GB 2020129.9 filed Dec. 18, 2020, the entire contents of each of which are hereby incorporated by reference.

FIELD OF THE INVENTION

This invention relates to the field of content delivery using a combination of unicast and multicast.

BACKGROUND TO THE INVENTION

Figure 1:
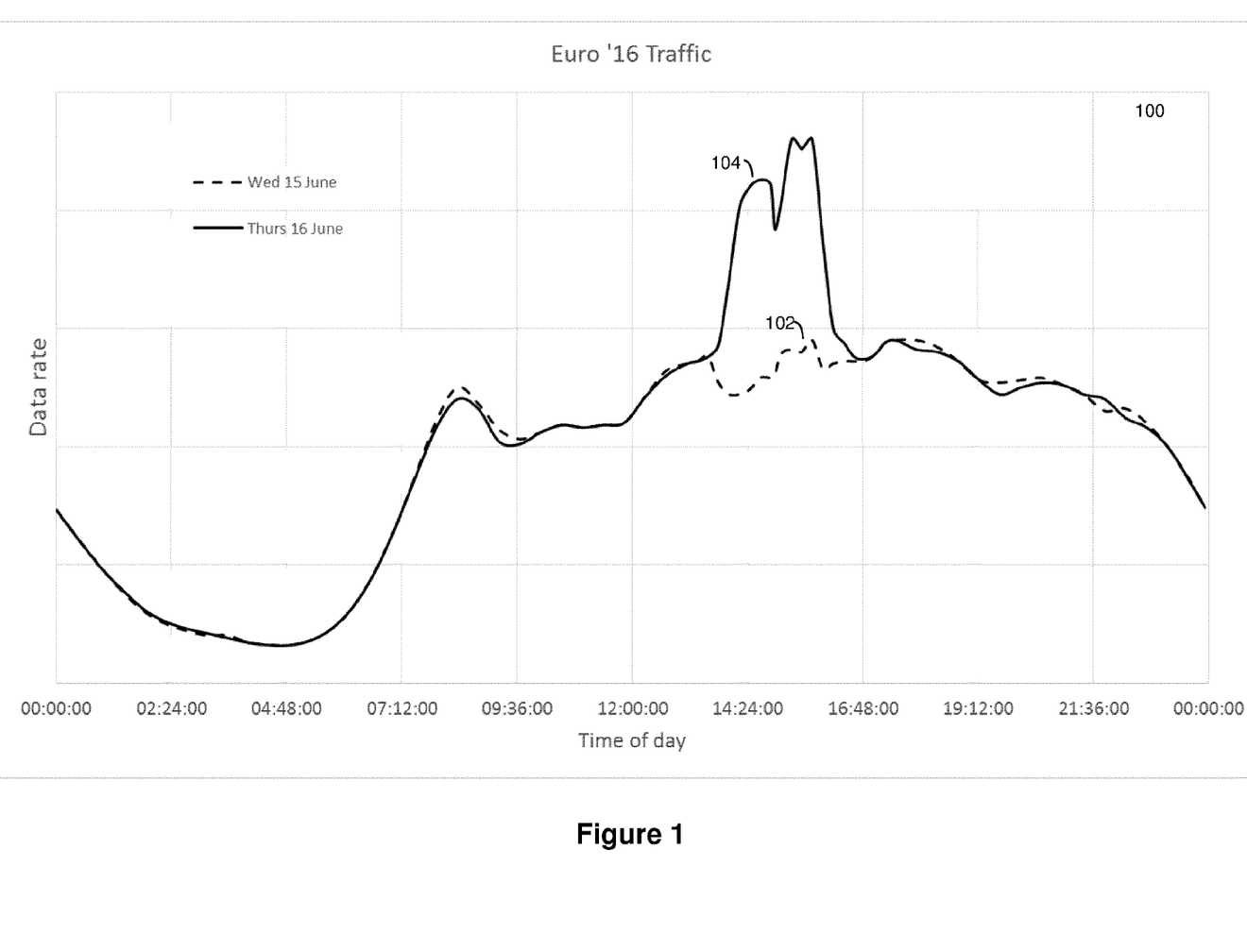
FIG. 1 is a graph showing traffic volume over a network on different days.

Increasing volumes of live content are being streamed using HTTP (or HTTPS). Popular live events drive extremely volatile demand, leading to a very high peak-to-mean ratio in traffic volumes. For example, the graph 100 in FIG. 1 shows an example of traffic volumes at gateways in a mobile network taken during the Euro 2016 football competition. Plot 102 shows traffic volumes on a day (Wed 15$^{th}$ June) without football, and plot 104 shows the traffic volumes the following day (Thu 16$^{th}$ June) when there was a football match on (England vs Wales). Both plots show roughly the same traffic volumes through the day, except Plot 104 has a significant additional peak in traffic between around 1400 and 1600 hours, resulting from customers streaming the football match.

This high peak-to-mean ratio poses a particular challenge in the network, where such peaks can cause a degradation of the users' quality of experience.

Most commonly, content is delivered over the Internet using HTTP (or HTTPS) request/response pairs. Client applications will send an HTTP request to a server and a response will be returned containing the content requested. Such request/responses are unicast in nature.

HTTP(S) can be used for video streaming. Typically, the client will obtain a manifest file which will allow the URLs of individual files containing video segments to be determined. The client will then request these segments in sequence and concatenate them to form a continuous stream for playback. Each video segment may also be available at different bitrates to allow the video rate to adapt to the available network throughput. This technique is known as HTTP Adaptive Streaming (HAS).

For users watching the same event, such as a live football match, each client will make their own HTTP requests and get their own HTTP responses, even though a large proportion of the content delivered to them within the HTTP responses will be identical between the clients. This results in very inefficient use of the network.

However, if the access network were able to use multicast for content delivery rather than unicast, then the impact of the live content peaks shown in FIG. 1 could be reduced significantly. Furthermore, the use of multicast in the access network could also significantly reduce the peak demand on the Content Delivery Network servers.

Solutions addressing such a problem already exist, where a multicast path is inserted into an otherwise unicast path between a client and a content server using proxies. Examples of such hybrid solutions include: "IP Multicast Adaptive Bit Rate Architecture Technical Report" OC-TR-IP-MULTI-ARCH-001-161026, 26/10/2016, by Cable Labs; 3GPP specifications, 23.246 (MBMS Architecture and functional description), 26.346 (MBMS Protocols and codecs) and 26.347 (MBMS APIs); and DVB "Adaptive Media Streaming over IP Multicast" ETSI TS 103 769 V1.1.1 (2020-11).

Figure 2:
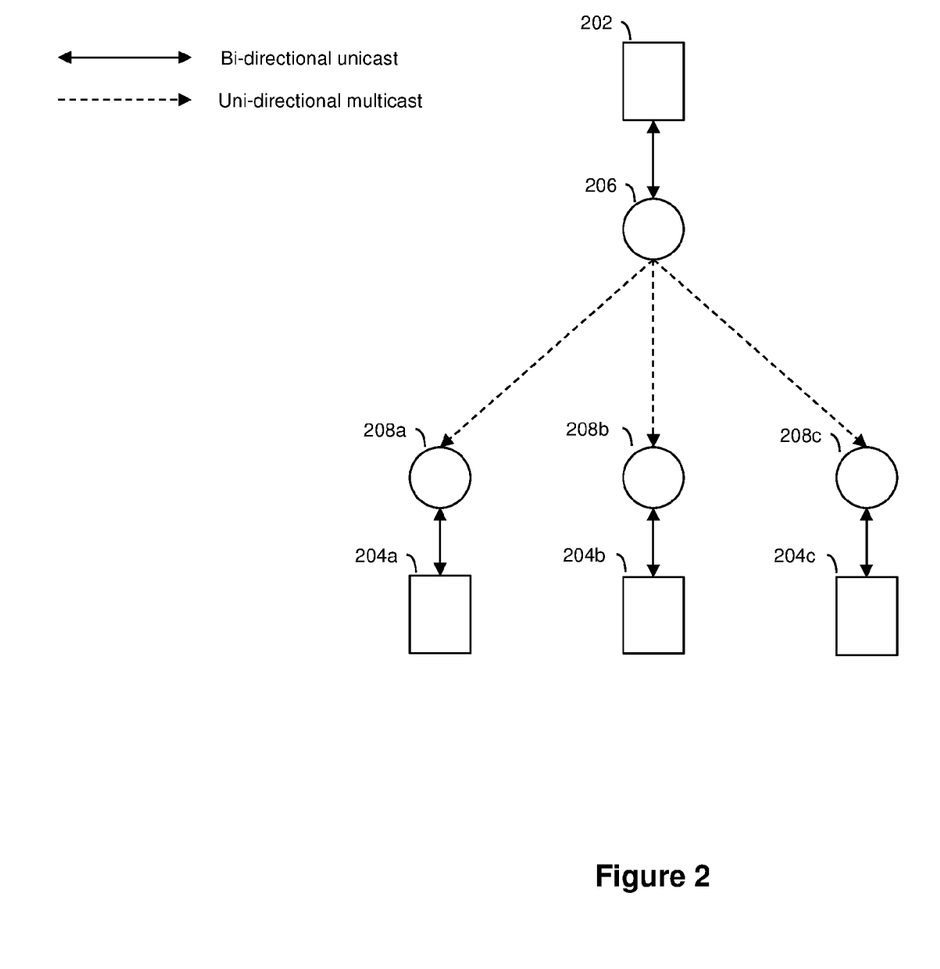
FIG. 2 is a network diagram of a general prior solutions.

FIG. 2 shows a generalised example of such solutions.

In FIG. 2, there is shown a content server 202 providing content such as video to client devices 204a, 204b and 204c. Multicast Proxy X 206 and three Proxy Ys 208a, 208b, and 208c, are inserted into the otherwise unicast path between content server 202 and the client devices. Proxy X 206 acquires unicast content from the content server 202 and makes it available via multicast. Proxy Y receives the multicast content and can make it available over unicast to any requesting client devices. All the client devices will receive identical responses to their requests for segments, as the same multicast content is received by all the Proxy Ys from Proxy X. The Proxy Ys can be located within the client devices, or separate devices or there may be just a single Proxy Y dependent on set-up.

In such a solution, Proxy X is pre-configured to act as client, and independently makes requests for content segments and dispatches the entire response into the multicast network. Proxy X does this by first requesting a manifest file and then making timely requests for the content segments described within it.

In such arrangements, the rate at which Proxy Y makes content available to client devices is constrained by the multicast rate between Proxy X and Proxy Y, as well as other factors such as whether Proxy Y has cached any of the content in advance. Thus, a client device utilising HAS may have problems properly monitoring the available network throughput from the content server to the client device, which in turn prevents the client devices adaptive bitrate algorithms functioning properly and switching between video rates under HAS.

Other unicast-multicast hybrid arrangements suffer from similar problems.

SUMMARY OF THE INVENTION

It is the aim of examples of the present invention to provide an improved content delivery mechanism.

According to one example of the invention, there is provided a method of managing content delivery over a network to a client device, said content comprising a sequence of segments and wherein each of the segments is encoded at a plurality of bit rates, said method comprising:
  receiving at a first network element one or more segments encoded at a first bit rate over multicast sent from a content server, and storing the one or more segments encoded at the first bit rate at the first network element, wherein the plurality of segments encoded at a first bit rate are received at a multicast reception rate;
  sending a request for data from the first network element to the content server over unicast, and receiving the requested data over unicast at the first network element at a unicast reception rate;
  determining a network throughput as the sum of the multicast reception rate and the unicast reception rate;
  transmitting one or more stored segments from the first network element to the client device over unicast at a transmission rate based on the determined network throughput.

The first network element may be a proxy server. The data requested may be dummy data, or a segment of content.

The multicast reception rate may be calculated as the size of a received segment divided by the total time taken to receive that segment. The unicast reception rate may be calculated as the size of the received data divided by the total time taken to receive the data.

The transmission rate may be set to no more than the network throughput. The transmission rate may be set to a fraction of the network throughput, for example 90% of the network throughput.

The method may further comprise:
receiving at the first network element from the client device a request for one or more further segments encoded at a second bit rate, wherein the second bit rate is higher than the first bit rate; and
receiving at the first network element the requested one or more further segments over multicast, and sending the received further segments to the client device over unicast.

According to a further example of the invention, there is provided a network element for managing content delivery to a client device, said content comprising a sequence of segments and wherein each of the segments is encoded at a plurality of bit rates, said network element adapted in operation to:
receive one or more segments encoded at a first bit rate over multicast sent from a content server, and store the one or more segments encoded at the first bit rate, wherein the plurality of segments encoded at a first bit rate are received at a multicast reception rate;
send a request for data from the first network element to the content server over unicast, and receive the requested data over unicast at a unicast reception rate;
determine a network throughput as the sum of the multicast reception rate and the unicast reception rate;
transmit one or more stored segments to the client device over unicast at a transmission rate based on the determined network throughput.

BRIEF DESCRIPTION OF THE DRAWINGS

For a better understanding of the present invention reference will now be made by way of example only to the accompanying drawings, in which.

DESCRIPTION OF PREFERRED
EMBODIMENTS

The present invention is described herein with reference to particular examples. The invention is not, however, limited to such examples.

Examples of the present invention provide a method of managing a network for delivering content to a client device, where content segments are delivered over multicast to a proxy. The received segments are stored at the proxy, before delivery of those segments is made from the proxy to the client device over unicast. Whilst the proxy receives further segments over multicast, it probes the network by making unicast requests for data (dummy data or additional content segments), and receiving those segments over unicast from the content server. The multicast rate reception rate and the unicast (probe) rate are measured and a maximum network throughput is calculated as the sum of these two rates. Subsequent segments are then delivered from the proxy to the client device at the calculated maximum network throughput rate, or at some rate dependent thereon. Thus, the client device will receive segments at a rate that is more indicative of the actual maximum network throughput, so can better use its adaptive bit rate algorithms to determine whether a switch to higher bit rate segments is appropriate. The higher bit rate segments can be provided by the proxy joining or establishing a suitable multicast group carrying the higher bit rate segments.

Figure 3:
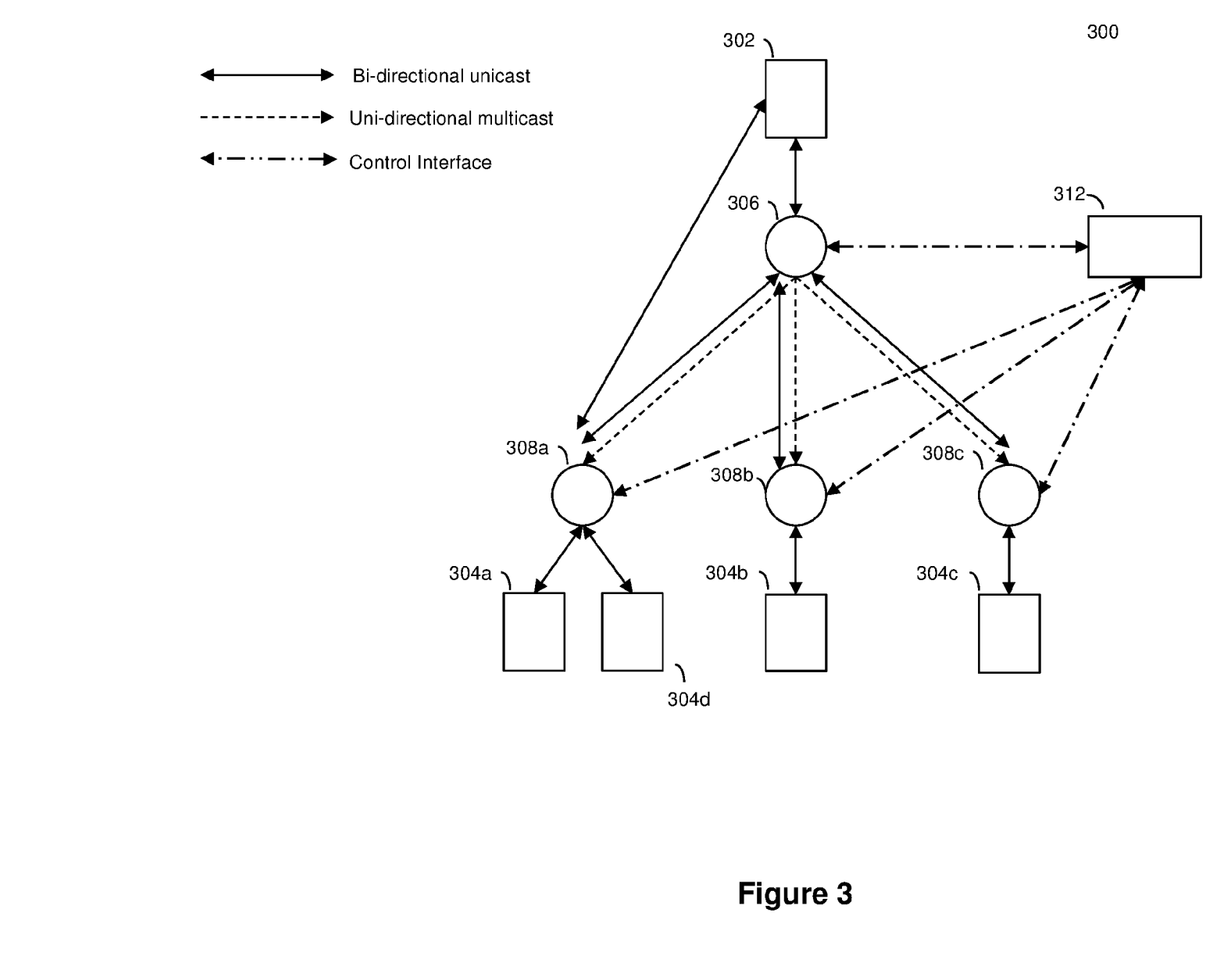
FIG. 3 is a network diagram showing the main components of an example of the present invention.

FIG. 3 shows the main components of a simplified "Multicast Assisted Unicast Delivery" (MAUD) network supporting content delivery. Examples of the present invention are applicable to a simplified MAUD network as described here. A person skilled in the art will also appreciate that the examples are equally applicable to other hybrid unicast/multicast delivery networks, such as the ones described above.

A more detailed MAUD arrangement is described in the Applicant's patent application EP19159748.3, which describes an arrangement referred to as "Multicast Assisted Unicast Delivery" (MAUD). Content is requested by client devices from a content server over unicast. The responses containing the requested content are separated into two components: a first component containing elements that are specific to individual client devices (for example session specific data), and a second component that is common to all client devices (typically this is the video content being requested). The first component can be delivered over unicast and the second component over multicast, and later recombined to form the original responses. The separation and recombination are handled by suitably configured proxy servers. Examples of the present invention can be applied to such a MAUD arrangement, though the splitting and recombining of the requested content is not key to examples of the present invention.

Returning to FIG. 3, the network 300 comprises: a content server 302; a Proxy X 306; Proxy Ys 308a, 308b, and 308c; client devices 304a, 304b, 304c, and 304d; and a multicast controller 312. The content server 302 provides content such as video to requesting entities, such as the client devices. The content server 302 may be located within a content delivery network (CDN), and there may be more than one content server. Proxy X 306 can communicate with the content server 302 over unicast. Proxy X 306 can also communicate with the Proxy Ys 308a, 308b, and 308c, over both unicast and multicast. Proxy Y 308a can communicate with client device 304a and 304d over unicast, Proxy Y 308b can communicate with client device 304b over unicast, and Proxy Y 308c can communicate with client device 304c over unicast.

The Proxy Ys can be located within the client devices, in separate devices (such as a home gateway), or there may be a single Proxy Y dependent on set-up.

Note, in FIG. 3, bi-directional unicast communication paths are marked with solid lines, uni-directional multicast communication paths are marked with dashed lines, and control interface communications paths are marked with a dot-dash line. The control interface communications paths carry control messaging/commands between the multicast controller 312 and other elements in the network. Other relevant communications paths will be described later.

The client devices are assumed to be running respective client applications, which are the source of content requests. For simplicity, the term client device from hereon in is used to refer to a client device running a client application. The client devices can make HTTP (or HTTPS) unicast requests for content held at the content server 302.

The content held at the content server 302 is typically media content (e.g. a TV programme, film or an entire linear TV channel) comprising video sequences encoded according a suitable standard such as the ITU H.264 standard. The video sequences are stored in the form of sequential temporal segments at the content server 302, where each segment is typically equivalent to 2 to 10 seconds of decoded video. The video sequences are also encoded at a plurality of bit rates or quality levels, resulting in a plurality of encoded sequences, each encoded at one of a plurality of bit rates. Such an arrangement is typical of an adaptive bit rate streaming service.

Manifest files are used by clients to identify where segments are located (by a URL in the manifest). Thus, a client device streams a video sequence by using the manifest to determine where to direct sequential unicast requests for each segment, at a particular bit rate, in turn as required. Such an arrangement is used in HTTP Adaptive Streaming technologies such as MPEG-DASH and Apple's HLS (HTTP Live Streaming).

The multicast controller 312 (MCC) monitors the operation of Proxy X and the Proxy Ys, and controls the proxies accordingly.

The Proxy Ys also include memory or other storage means (such as solid state memory), for storing segments before transmission to any connected client devices. The control of the onward transmission of segments from Proxy Ys will be described in more detail in examples below.

Some HTTP requests made by the client devices for content will not make full use of the MAUD arrangement, but instead requests may be sent directly to the content server. Other requests for content from a client device that may benefit from MAUD are redirected to, or simply intercepted by, one of the Proxy Ys.

The Proxy Ys can be inserted in the HTTP path using any of a number of well-known techniques, such as using an HTTP redirection from the content server 302. In this case, the content server 302 would be configured such that requests for potentially popular content are not served directly but instead redirected to a suitable Proxy Y. For example, instead of supplying a normal response, the content server 302 could respond with an HTTP status code 307 which indicates a temporary redirect. This invites the client device to make a new request to the new URL supplied by the content server in its response, thus enabling requests to be made to Proxy Y. This technique allows the content server and Proxy Y to exist in different domains, which would often be the case.

Other mechanisms to insert Proxy Y in the HTTP path include: Proxy Y configured as a transparent proxy (though all requests are intercepted by it, and only works with unencrypted traffic); Proxy Y configured as a forward proxy (where the client device sends its requests directly to Proxy Y by virtue of being explicitly configured to do so); DNS hijacking (where a DNS server is configured to supply the IP address of Proxy Y for domains of interest); and manifest manipulation (where the manifest file is re-written so that requests are made directly to Proxy Y).

Figure 4:
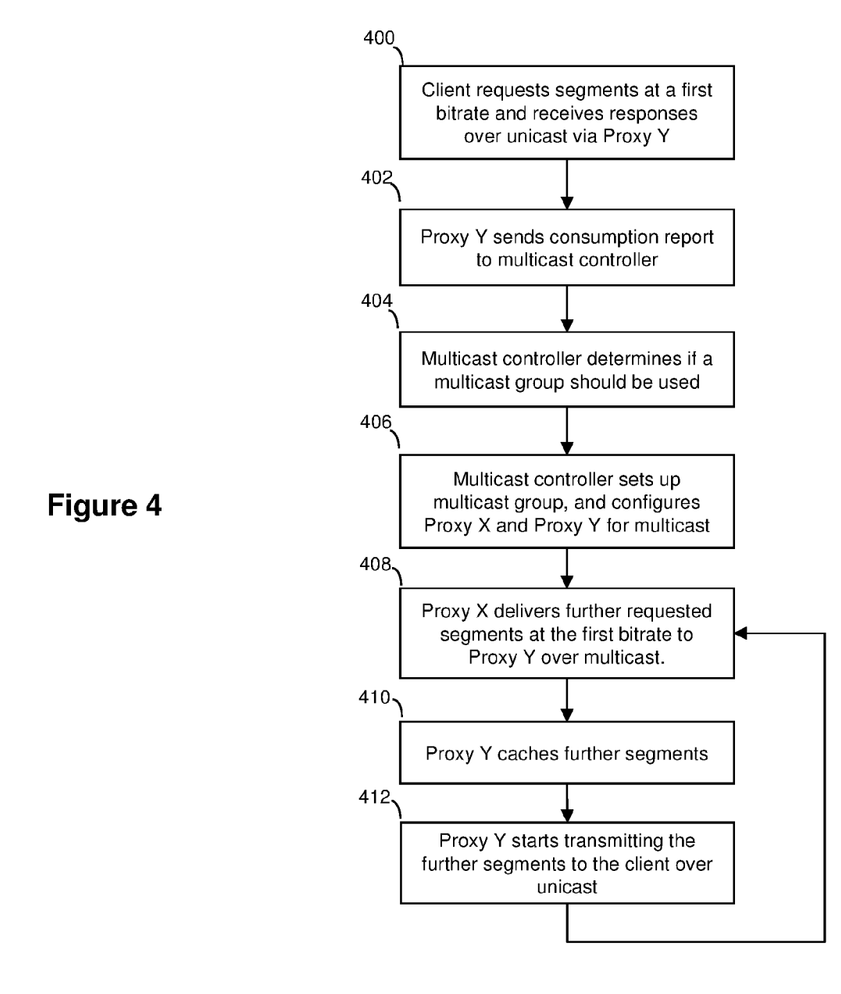
FIG. 4 is a flow chart summarising the steps of establishing a steady state multicast session in an example of the invention.

FIG. 4 shows a flow chart summarising the steps of establishing a multicast session for delivery of content to a client device.

Starting at step 400, one or more client devices make requests for segments of content, such as a film stored at the content server 302, and receives responses (the segments) over unicast via Proxy Y. For example, client device 304a makes HTTP GET requests, which are unicast in nature, directed to segments of content encoded at a particular bit rate. This initial or first bit rate may be chosen to be the lowest bit rate available, or the bit rate could be chosen some other way, such as based on historical data or user preference. Each HTTP GET request includes the URL of where that segment can be retrieved from. The URLs are found in the manifest file associated with the content. The requests are received by Proxy Y 308a, and forwarded to the content server 302.

The content server 302 responds with HTTP responses, each containing a requested segment. The HTTP responses are unicast responses. The responses are received by Proxy Y 308a and sent to the client device 304a. The received segments can then be viewed by the client device 304a.

The client device 304a could continue to request and receive segments according to step 400 until streaming of that content is complete. However, in examples of the invention, the multicast controller 312 determines whether a multicast group should be used to deliver subsequent segments.

In step 402, Proxy Y 308a sends a consumption report to the multicast controller 312, with data relating to the HTTP request/response pairs that are passing through the proxy e.g. the URL of each HTTP request. The consumption report can be sent to the multicast controller 312 at intervals—either a time interval or after a certain number of segments have been requested/received.

Now, the HTTP requests and response describes so far are all unicast in nature. However, it should be noted that requests for the same content might be made by other client devices. This is typical during for example a live football match. Proxy Y 308a and other Proxy Ys (308b or 308c) as appropriate send consumption reports to the multicast controller 312 for their respective client devices, so that the multicast controller 312 can determine whether or not to use multicast to help deliver further content.

In step 404, the multicast controller 312 uses the received reports to determine whether the HTTP requests reported from a given population of Proxy Ys justifies the use of multicast for their responses. Such a population of Proxy Ys is referred to as a 'cohort'. Assuming certain conditions are satisfied (for example, greater than a certain number of client devices requesting the same content at a similar time), the multicast controller 312 will configure Proxy X and any relevant Proxy Ys (that is the cohort) for multicast assisted delivery by setting up a suitable multicast group. Once the multicast group has been set up, content (requested segments) are sent to Proxy Y from Proxy X using multicast.

In step 406, the multicast controller 312 can add Proxy Y 308a to a cohort by sending Proxy Y 308a instructions to set up an HTTP request route, whereby requests matching a particular URL path/pattern/string are directed to Proxy X 306. The multicast controller 312 also sends Proxy Y 308a instructions to provision a multicast listener. The instructions tell Proxy Y 308a to prepare to receive multicast. The multicast listener causes Proxy Y to issue an IGMP join command to a multicast address specified by the multicast controller.

To allow the Proxy X 306 to use multicast for the return path for responses to requests that meet the match pattern set up for Proxy Y 306, the multicast controller 312 configures Proxy X 306 to use multicast for certain responses sent by the content server. For example, the instruction could be to only use multicast assistance for responses that contain video files or MIME types such as "video/mp4" or "video/MP2T", so that only responses containing video traffic are sent over multicast. In an alternative example, responses can be selected based on specific Etags or a range of Etags. Etags (Entity Tags) are part of the HTTP 1.1 specification and are used to uniquely identify response payloads.

Proxy X 306 and one or more of the Proxy Ys are now configured for respectively sending and receiving content over multicast.

In step 408, HTTP GET requests are sent by client device 304a over unicast and received at Proxy Y 308a for further segments encoded at the first bit rate. Proxy Y 308a checks to see if the requests match the pattern set out earlier. A match effectively means that the response to the request is to be delivered over multicast. In this example, it is assumed there is a match, and Proxy Y 308a sends the HTTP GET requests onto Proxy X 306 (instead of to the content server 302 directly).

Proxy X 306 sends the received HTTP GET requests to the content server 302, which responds with the requested further segments (encoded at the first bit rate) in HTTP responses to Proxy X 306. Proxy X 306 then sends these further segments over multicast. These segments are typically sent at a multicast transmission rate that is at least sufficient to ensure timely delivery.

Proxy Y 308a is configured to receive multicast, and thus will receive these further segments sent over multicast from Proxy X 306. These further segments are cached at Proxy Y 308a in step 410.

In step 412, Proxy Y 308a starts transmitting these further segments to the client device 304a.

Processing then passes back to step 408, with Proxy Y 308a continuing to receive further segments over multicast, caching them, and sending them onto the client device 308a over unicast.

As described, Proxy Y may store one or more segments in its cache that have been delivered over multicast before they are sent onto the client device 304a. This can be achieved if the multicast reception rate at Proxy Y is higher than the unicast transmission rate from proxy Y to the client device 304a.

Alternatively, there could be more than one client device connected to Proxy Y 308a that are all requesting the same content, but might not be requesting the content at precisely the same time as one another. In such cases, there will be one or more "trailing" client devices which make requests for content segments that are already cached at Proxy Y 308a, for example, as a result of the steps in FIG. 4.

In summary, the steps of FIG. 4 (and in particular steps 408 to 412, and the cohort variant described above) represent establishing a steady state multicast session for content delivery, whereby content segments are sent over multicast to a proxy (Proxy Y), before being sent over unicast from the proxy to the client device.

The rate at which the client device 304a receives segments from Proxy Y 308a over unicast might reasonably be limited to the multicast rate between Proxy X and Proxy Y, so as to avoid running down any cache and experiencing buffer underflow. The Applicants' patent application EP 19194759.7 sets out a method for setting a potential multicast rate.

However, having the multicast rate fixed means that the client device 304a can never truly determine the maximum throughput between the content server and the client device 304a. Consequently, the client device 304a cannot properly determine whether the network can support a higher bit rate stream of segments using its adaptive bit rate algorithms, and thus cannot accurately determine whether requests for segments encoded at a higher bit rate could be delivered in a timely manner for decoding.

Figure 5:
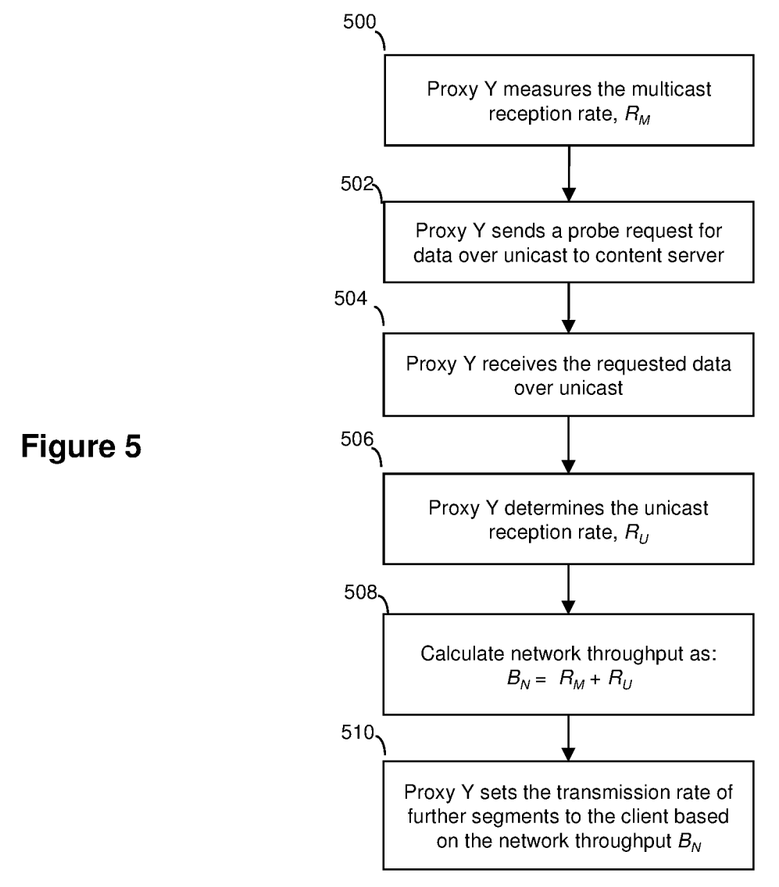
FIG. 5 is a flow chart summarising the steps of making a unicast probe in an example of the invention.

FIG. 5 shows a flow chart summarising the steps of an example of the present invention. The steps of FIG. 5 can be configured to occur intermittently (for example under the control of the multicast controller 312, or just periodically) whilst Proxy Y 308a remains in its multicast group and continues to receive segments over multicast, caching the segments, and sending them onto the client 304a over unicast. In effect, the steps of FIG. 5 take place after step 410 (in the first or any subsequent loop of steps 408 to 412).

In step 500, Proxy Y 308a measures the current multicast reception rate $R_M$. This can be done by dividing a received segment size by the total time taken to receive that segment.

In step 502, Proxy Y 308a probes the network by sending a unicast request for data to the content server 302. The data can be dummy data or already requested segment or future segments (the nature of the data is not important, as the data is not used after it has been received). The requests can take the form of HTTP GET requests.

In step 504, Proxy Y 308a receives the requested data from the content server over unicast.

In step 506, the rate at which the requested data is received (or unicast reception rate) $R_U$ is measured. This unicast reception rate can be measured by dividing the received data size by the time taken to receive the data.

In step 508, Proxy Y 308a calculates the total network throughput or bandwidth $B_N$ as the sum of the multicast reception rate $R_M$ (step 500) and the unicast reception rate $R_U$ (506):

$$B_N = R_M + R_U \qquad (1)$$

The total network throughput $B_N$ is a measure of the total capacity of the network from the content server 302 to Proxy Y 308a.

In step 510, Proxy Y 308a can use the total network throughput $B_N$ to set the transmission rate at which to transmit further segments to the client 304a in step 412. Thus, the unicast transmission rate at which further segments are transmitted could for example be set to equal the total network throughput $B_N$, thereby allowing the client device 304a to get a true picture of the throughput in the network rather than simply the multicast rate or some other constrained rate. In practice, the unicast transmission rate from Proxy Y to the client device might be set to a fraction, say 90%, of the total network throughput. The total network throughput $B_N$ can provide an upper limit on the unicast transmission rate.

Turning back to step 412 in FIG. 4, Proxy Y 308a transmits further segments to the client device 304a at this rate set in step 510.

Intermittently, after receiving segments from Proxy Y 308a, the client device 304a can use its ABR algorithm to determine whether to trigger a switch to segments encoded at a higher bit rate. This is illustrated by the flow chart of FIG. 6, which can take place intermittently at any time whilst client device 308a is receiving content segments.

Figure 6:
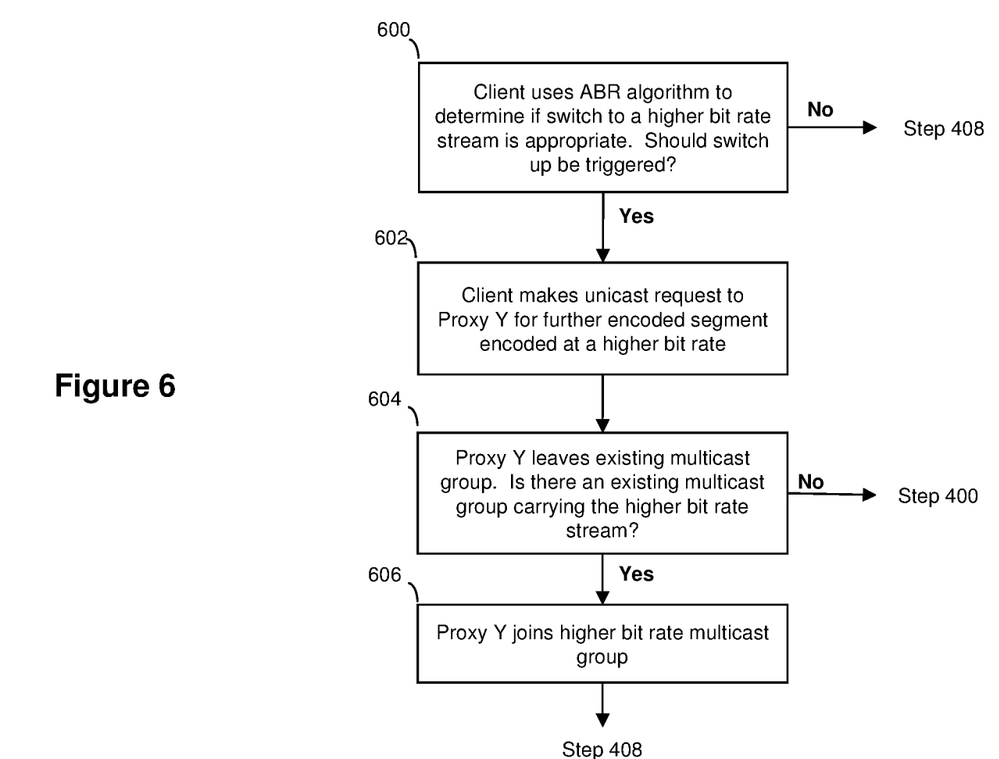
FIG. 6 is a flow chart summarising the steps of a client device determining whether to switch up to a higher bit rate stream in an example of the invention.

In step 600, the client device 304a uses its ABR algorithm, taking into account the segment reception rate and the bit rate of available encoded segments, to determine if a switch to higher bit rate segments should take place. If the client device 304a determines that a switch to a higher bit rate stream should take place, processing passes to step 602 to start requesting higher bit rate segments. If the client device 304a determines that a switch to a higher bit rate stream should not take place, processing passes back to step 408 where Proxy Y 308a continues to receive further segments over multicast.

In step 602, the client device 308a makes a unicast request to Proxy Y 308a for a further segment encoded at a higher bit rate than the first bit rate.

In step 604, Proxy Y 308a receives the request and can service the request for a segment encoded at a higher bit rate in a number of ways. Proxy Y 308a can first leave the existing multicast group, and if there is an existing multicast group carrying the higher bit rate stream, then processing passes to step 606 where Proxy Y 304a can join that new multicast group. Proxy Y 304a will then receive the requested segment encoded at the higher bit rate over multicast from the content server via Proxy X, and send it onto the client device 304a over unicast, with processing effectively passing back to step 408.

However, if there is not a suitable multicast group, processing can pass back to step 400, where the request is initially serviced over unicast, but at some later point a suitable multicast group can be established to deliver the segments encoded at a higher bit rate over multicast to Proxy Y 308a.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing content delivery over a network to a client device, said content comprising a sequence of segments and wherein each of the segments is encoded at a plurality of bit rates, said method comprising:
   i) receiving at a first network element one or more segments encoded at a first bit rate over multicast sent from a content server, and storing the one or more segments encoded at the first bit rate at the first network element, wherein the plurality of segments encoded at a first bit rate are received at a multicast reception rate;
   ii) sending a request for data from the first network element to the content server over unicast, and receiving the requested data over unicast at the first network element at a unicast reception rate;
   iii) determining a network throughput as the sum of the multicast reception rate and the unicast reception rate;
   iv) transmitting one or more stored segments from the first network element to the client device over unicast at a transmission rate based on the determined network throughput.

2. A method according to claim 1, wherein the data requested is dummy data.

3. A method according to claim 1, wherein the data requested is a segment of content.

4. A method according to claim 1, wherein the multicast reception rate is the size of a received segment divided by the total time taken to receive that segment.

5. A method according to claim 1, wherein the unicast reception rate is the size of the received data divided by the total time taken to receive the data.

6. A method according to claim 1, wherein the transmission rate is set to no more than the network throughput.

7. A method according to claim 6, wherein the wherein the transmission rate is set to a fraction of the network throughput.

8. A method according to claim 1, further comprising:
   v) receiving at the first network element from the client device a request for one or more further segments encoded at a second bit rate, wherein the second bit rate is higher than the first bit rate; and
   vi) receiving at the first network element the requested one or more further segments over multicast, and sending the received further segments to the client device over unicast.

9. A network element for managing content delivery to a client device, said content comprising a sequence of segments and wherein each of the segments is encoded at a plurality of bit rates, said network element adapted in operation to:
   receive one or more segments encoded at a first bit rate over multicast sent from a content server, and store the one or more segments encoded at the first bit rate, wherein the plurality of segments encoded at a first bit rate are received at a multicast reception rate;
   send a request for data from the first network element to the content server over unicast, and receive the requested data over unicast at a unicast reception rate;
   determine a network throughput as the sum of the multicast reception rate and the unicast reception rate;
   transmit one or more stored segments to the client device over unicast at a transmission rate based on the determined network throughput.

10. The network element according to claim 9, wherein the data requested is dummy data.

11. The network element according to claim 9, wherein the data requested is a segment of content.

12. The network element according to claim 9, wherein the multicast reception rate is the size of a received segment divided by the total time taken to receive that segment.

13. The network element according to claim 9, wherein the unicast reception rate is the size of the received data divided by the total time taken to receive the data.

14. The network element according to claim 9, wherein the transmission rate is set to no more than the network throughput.

15. A network element according to claim 14, wherein the transmission rate is set to a fraction of the network throughput.

16. The network element according to claim 9, the network element is further adapted in operation to:
   receive at the first network element from the client device a request for one or more further segments encoded at a second bit rate, wherein the second bit rate is higher than the first bit rate; and
   receive at the first network element the requested one or more further segments over multicast, and sending the received further segments to the client device over unicast.

17. The network element according to claim 9, wherein the network element is adapted in operation to, while receiving the one or more segments over multicast:
   send the request for data from the first network element to the content server over unicast, and receive the requested data over unicast at the unicast reception rate;
   determine the network throughput as the sum of the multicast reception rate and the unicast reception rate; and transmit the one or more stored segments to the client device over unicast at the transmission rate based on the determined network throughput.

18. The method according to claim 1, wherein steps ii)-iv) are performed while receiving the one or more segments over multicast.

\* \* \* \* \*